US005749670A

United States Patent [19]
Astor

[11] Patent Number: 5,749,670
[45] Date of Patent: May 12, 1998

[54] METHOD FOR FASTENING PARTS TOGETHER AND RESULTING STRUCTURE

[75] Inventor: John J. Astor, Bradford, Pa.

[73] Assignee: Dresser-Rand Company, Olean, N.Y.

[21] Appl. No.: 627,465

[22] Filed: Apr. 4, 1996

[51] Int. Cl.⁶ .................................. F16B 5/02; F16B 5/08
[52] U.S. Cl. ........................ 403/269; 403/270; 403/315; 411/82; 411/930; 29/525.14
[58] Field of Search .................................. 403/265, 266, 403/267, 268, 269, 270, 271, 272, 315; 411/82, 258, 930, 171; 29/525.13–525.14

[56] References Cited

U.S. PATENT DOCUMENTS

| | | |
|---|---|---|
| 1,407,202 | 2/1922 | Kubler . |
| 1,516,975 | 11/1924 | McArthur .................. 403/268 |
| 2,141,071 | 12/1938 | Sorensen .................. 411/930 X |
| 2,143,484 | 1/1939 | Jacobsen .................. 403/272 X |
| 2,367,445 | 1/1945 | Stoltenberg .................. 403/265 X |
| 2,550,357 | 4/1951 | Jansen et al. .................. 411/258 X |
| 2,844,363 | 7/1958 | Clark .................. 259/144 |
| 2,884,038 | 4/1959 | Overton .................. 411/82 |
| 3,139,032 | 6/1964 | Silverstein .................. 403/268 |
| 3,226,140 | 12/1965 | Voegeli .................. 403/272 |
| 4,502,092 | 2/1985 | Bannink, Jr. et al. .................. 361/218 |
| 4,599,781 | 7/1986 | Diperstein .................. 29/402.11 |
| 4,877,249 | 10/1989 | Thompson .................. 273/169 |
| 4,945,625 | 8/1990 | Winston .................. 29/524.1 |
| 4,979,281 | 12/1990 | Smith et al. .................. 29/525.1 |

*Primary Examiner*—Harry C. Kim
*Attorney, Agent, or Firm*—Haynes and Boone, L.L.P.

[57] ABSTRACT

A method for securely joining together at least first and second structural elements without disrupting the contour or continuity of the surfaces of the structure or the structural elements is disclosed. The first structural element has a first hole having a counterbored section. The counterbored section has a recessed cavity therein, which is open to the counterbored section and has an upper wall that extends generally radially outwardly from the longitudinal axis of the first hole. The second structural element has a second hole in coaxial alignment with the first hole. A fastener, such as a bolt or stud and nut combination, is inserted into the coaxially aligned holes so that the structural elements are thereby joined and the head of the bolt or nut is recessed in the counterbored section of the first hole. A suitable castable material, e.g. aluminum, is then applied to the first hole so as to fill any remaining space in the hole, including the counterbored section and the recessed cavity. When the castable material has hardened, the thus filled recessed cavity prevents the cast material from loosening or falling out of the hole, thereby securing the fastener in the structural elements. The surface of the first structural element is then finished, by turning or milling for example, so as to provide a smooth and continuous surface.

20 Claims, 1 Drawing Sheet

METHOD FOR FASTENING PARTS TOGETHER AND RESULTING STRUCTURE

FIELD OF THE INVENTION

This invention relates to a method of fastening two or more parts together and to the resulting structure.

BACKGROUND OF THE INVENTION

In many industries it is necessary to join machine parts together without distorting the contour or continuity of the surfaces of the parts. For example, in the aerodynamic industry, external airplane surfaces must be smooth and free of protrusions in order to reduce drag and to avoid detection by radar. Automobiles also require smooth outer surfaces, both for aesthetics and functional efficiency. In a variety of machinery having moving parts, those parts must be able to smoothly interact without interference from protruding fasteners. Not only must parts be smoothly joined, but they must also be securely joined and able to withstand mechanical and vibrational stress. In some applications, surfaces must also be free of electrical discontinuities. For example, an airplane with exposed metal fasteners can attract lightning strikes. It is therefore desirable to securely fasten together parts of a structure without disrupting the contour or continuity of the surfaces of the structure.

A simple way to fasten parts of a structure together without affecting the surfaces of the structure is to use an adhesive material. Glue and epoxy are common examples of adhesive materials. Using an adhesive has several disadvantages: the adhesive may not bond with the parts; the adhesive may not resist water or high temperatures; and the adhesive may not withstand mechanical or vibrational stress.

Another simple way to join parts is with a bolt, or nut and stud combination, inserted into aligned holes in the parts. While bolts are able to withstand water, heat, and mechanical stress, the head of the bolt and the nut generally protrude beyond the surface of the joined parts. However, if the holes have a countersink or counterbore, then the bolt head or nut can be recessed within the countersink/bore. This configuration also allows for the "land"—the small cylindrical junction of the upper and under head surface of a sloped bolt head that eliminates any sharp edges—to be incorporated within the counterbored portion of the hole. One problem with this configuration is a loosening of the parts if vibrations cause the bolt, stud, or nut to loosen or fall out. Another problem with this configuration is the surface discontinuity created by the remaining hole space above the nut or bolt head and between the nut or bolt head and the sidewalls of the hole. A further problem with this configuration arises when the bolt is used to fasten parts with curved surfaces. If a bolt having a flat head is inserted into a curved part, the continuity of the surface is disrupted, even when the counterbored hole encompasses the bolt head. Another surface discontinuity arises from internal wrenching recesses in the bolt head, such as slots for a screw driver or allen wrench.

Putties could be applied to fill in these discontinuities. Or, covers bonded to the fastener head or jammed into the wrenching recess can partially fill in the remaining hole space. Neither of these methods provides a smooth external contour, particularly if the surface is curved. The internal wrenching recess could be eliminated if the bolt can be torqued from the shank end. For example, the internal wrenching recess can be provided at the threaded end of the bolt. However, in many applications, access to the opposite end of the fastener is restricted. Another approach is to use detachable (frangible) external torquing surfaces attached to the head of the fastener and designed to break off after the proper torque level is reached. Such a fastener has several disadvantages: the fastener cannot be removed except by means of an easy out (requiring drilling into the fastener head itself) and a rough external head surface remains.

Not only is it desirable that a fastener join parts of a structure together without disrupting the contour or smoothness of the surface of the structure, the fastener must securely join the parts as well. Metal fasteners are often used because of their strength. However, a common source of failure of conventional metal fasteners is caused by the vibration or movement between the metal fastener and a metal part. The movement results in the fatiguing and the wear of the metal fastener, which enables further movement resulting in further deteriorations of the fastener. Furthermore, failure can occur when a fastener is inserted into a hole in a part having an irregular internal shape, or when there is movement between the parts after being joined together.

Another problem occurs when the parts are made of composite materials, such as graphite fiber reinforced epoxy resins. When these materials are used in the wings of aircraft, for example, a significant safety problem can exist. While the structure of the wing can be made of composite materials, the fasteners used are typically metal in order to obtain sufficient structural strength. The difference in electrical conductivity between the composite material and the metal fastener causes lightning to become attracted to the metallic fastener head. The fastener can then conduct current into the interior of the wing and cause internal arcing inside a fuel tank. If fuel vapors are present in the tank, such arcing can cause an explosion. It is therefore necessary to provide some sort of protection for external metal fasteners used in composite structures to prevent lightning strikes. Many other applications can also require electrical surface continuity when the fastener and structures are made of different materials.

One approach for providing electrical continuity is to apply a coat of paint over the surfaces of the structure and thus cover the exposed heads of the fasteners. However, the gap between the fastener head and its counterbored hole can cause the paint to thin and crack around the outer edge of the fastener. This thinning and cracking of the paint in turn causes a difference in electrical conductivity which causes electrical streamers to form around the edges of the fastener heads. These streamers create an electrical field, thereby disrupting the electrical continuity of the surface and increasing the chance of a lightning strike hitting a fastener head.

Alternatively, a fastener having a resilient dielectric cap could be used. A problem with this fastener is that the cap encompasses a portion of the frustoconical underhead surface and when installed is wedged between the fastener head and the counterbored portion of the hole. In heavily loaded structures the resilient material between the fastener head and counterbore can tend to extrude under cyclic loading and cause the fastener to eventually become loose fitting therein. Additionally, because the cap is installed with a given thickness and tolerance it may not always provide a smooth external contour. Another approach for providing protection for metal fasteners in composite structures is to encapsulate the entire fastener in composite material. This type of fastener is subject to the same deficiencies as the preceding example. In another approach, a plastic strip is placed over the outer surface while a potting compound is used to fill the space over the fastener. None of the above fastener systems designed for use with composite materials are suitable for use with metal surfaces. In addition, the caps or material used to fill in the space above the fastener can loosen or fall out when the structure is subjected to vibrational stress. Not only is the surface continuity then disrupted, but the loose cap or material can cause machine failure, such as by interfering with the movement of machine parts or plugging channels within the machine.

It is therefore an object of the present invention to securely join parts of a structure together without causing a disruption in the contour or shape of the surfaces of the joined structure. It is also an object of the present invention to securely join parts of a structure so that the parts can smoothly interact without interference from protruding fasteners. Another object of the present invention is to securely join parts of a structure together with a fastener able to withstand vibrational and other mechanical stress. A further object of the present invention is to securely join parts of a structure together without disrupting the electrical continuity of the surface of the structure.

SUMMARY OF THE INVENTION

The invention is a method for securely joining parts of a structure together without disrupting the contour, continuity or shape of the surfaces of the structure. A hole is formed in the parts to be joined, with the hole having a counterbored portion within one of the parts. At least one recessed cavity, e.g. an annular groove, is formed in the counterbored portion of the hole. A fastener, e.g. a bolt or stud and nut combination, is inserted into the hole so that the nut or the bolt head is recessed in the counterbored portion of the hole and the parts are securely fastened together. A suitable castable material, e.g. aluminum, is applied to fill the space remaining in the hole, including the recessed cavity. When the castable material hardens, the filled recessed cavity prevents the thus cast material from being forcibly removed from the hole by vibrations or other mechanical stress. The surface of the structure can then be finished to provide a smooth and continuous surface.

DETAILED DESCRIPTION

Figure 1:
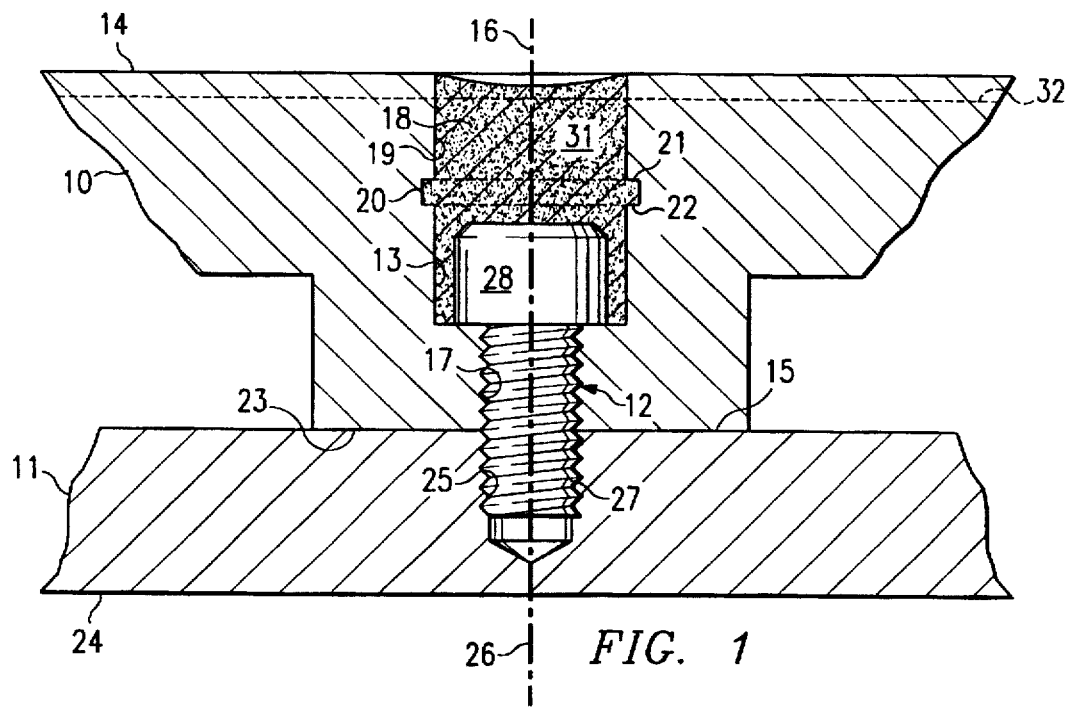
FIG. 1 is a cross sectional view of two structural components joined by a bolt. The bolt is recessed in a counterbored hole having an annular groove and filled with a castable material.

FIG. 1 is a cross sectional view of two components 10 and 11 joined together by a bolt 12 according to the present invention. Component 10 has a first hole 13 which extends therethrough from a first surface 14 to an opposite second surface 15. The hole 13 has a longitudinal axis 16 and a first axial section 17 and a coaxially aligned counterbored section 18 that extends from the first surface 14 to the first axial section 17. The counterbored section has an annular sidewall 19 with at least one recessed cavity 20. The recessed cavity has a first wall 21 and second wall 22, with the second wall located between the first wall 21 and the first axial section 17. The first wall extends generally radially outwardly from the longitudinal axis of hole 13. The counterbored section is cylindrically shaped in FIG. 1, but the counterbored section could be any suitable shape, e.g. frustoconical. The recessed cavity shown in FIG. 1 is in the shape of an annular groove, with the first wall 21 running circularly around the circumference of the counterbored section. The recessed cavity can be formed in a variety of other shapes, e.g. a notch or notches, and can be formed at any location within the counterbored section. The recessed cavity is preferably formed by a thread mill, and may be formed by other means, e.g. by a feed out attachment, or a special grooving tool. The thread mill uses a single or multi point milling tool inserted into the counterbored section of the hole. The milling tool feeds into the sidewall of the counterbored section, rotates so as to cut around the circumference of the counterbored section, and then retracts. A feed out attachment uses a slide arrangement that rotates around the center of the counterbored section to cut the groove. The special grooving tool is an attachment used with a drill press. As the drill spindle is fed into the center of the hole, it feeds out a groove tool to a predetermined depth, and then retracts the groove tool.

Component 11 has a first surface 23 and a second opposite surface 24. A hole 25, having a longitudinal axis 26, extends from first surface 23 into component 11. The hole 25 is in coaxial alignment with hole 13 in component 10, with the counterbored section of hole 13 remote from component 11. The coaxially aligned holes 13 and 25 receive the bolt 12 which has a shank 27 and a head 28. The bolt is inserted into the first hole 13 at the first surface 14 of component 10 and extends through component 10 and into hole 25 so as to join together components 10 and 11. The head 28 is recessed in the counterbored section of hole 13, but only occupies a portion of the counterbored section so that a portion of the counterbored section above the bolt head remains unoccupied. To further secure the components 10 and 11, at least one of the holes can be tapped to receive the threads of the bolt. The bolt may be made of any suitable material and is preferably a Grade 8 commercial bolt, but any other suitable grade bolt can be used as well.

A suitable castable material 31, such as a metal, thermoset polymer, or thermoplastic polymer, is applied to the counterbored section of hole 13. For example, the castable material can be aluminum, brass, bronze, cast iron, steel, ceramics, epoxy resin solutions, or machine grouts. Preferably, the castable material is aluminum. If one or both of components 10 and 11 are made of a composite material, then the castable material is preferably a polymeric material, e.g. a resin. If one or more of the components will be exposed to a corrosive material, for example if the components are part of a compressor containing an acidic gas, then the castable material is preferably a ceramic when applied to the hole, the castable material is in a flowable state so as to fill the counterbored section and the recessed cavity. When the castable material hardens, the thus cast material will be secured within component 10, with the first wall 21 of the recessed cavity preventing the hardened cast material from loosening or falling out of the hole 13 due to vibrations or mechanical stress.

The first surface 14 of component 10 is then finished in order to provide a smooth surface 32. The surface can be smoothed by removing any excess castable material 31 on surface 14. Or, component 10 can be thinned to form a new surface 32, so that the level of castable material in hole 13 is flush with the new surface. The surface may be finished by turning, milling or grinding. Preferably the surface is finished by metal cutting with either a lathe or a mill, depending on the location of the joined components. Grinding is preferably used when component 10 is made of ceramic.

In another embodiment, the hole 25 in component 11 may include a coaxially aligned counterbored section and recessed cavity therein, as described for component 10, that extends from surface 24 towards surface 23. The counterbored section receives a nut that threadably attaches to the bolt shank 27. In such an embodiment, the hole 25 must extend throughout the component 12 from the first surface 23 to second surface 24 to allow access to the shank 27.

Figure 2:
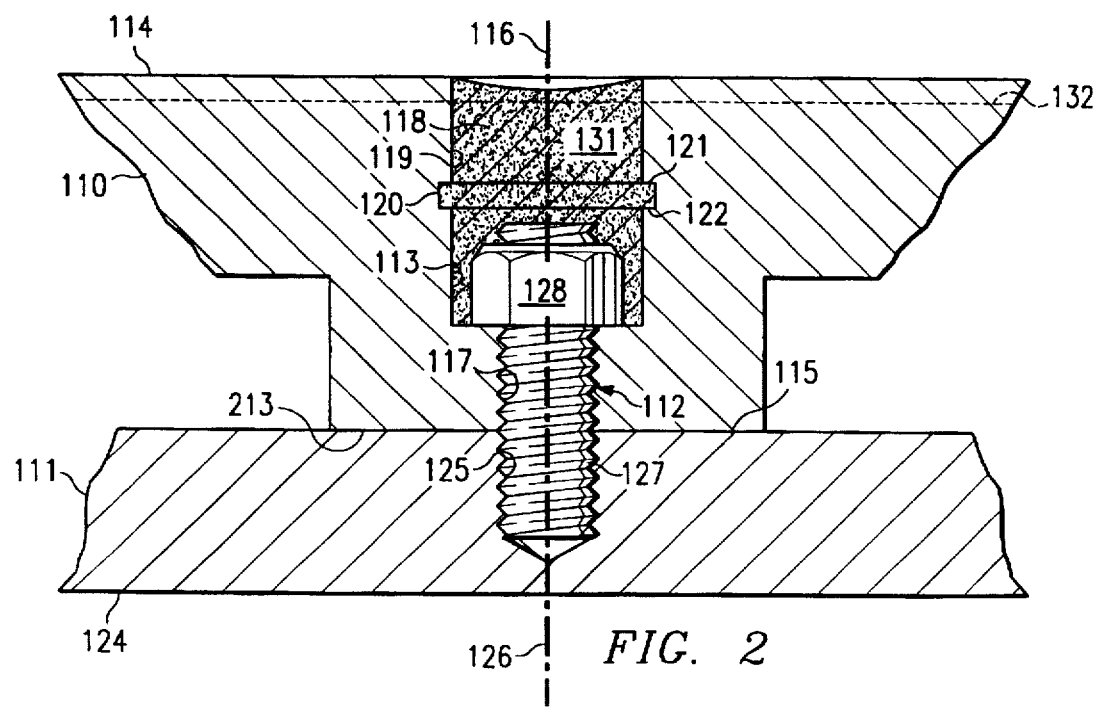
FIG. 2 is a cross sectional view of two structural components joined by a stud and nut combination The stud and nut are recessed in a counterbored hole having an annular groove and filled with a castable material.

FIG. 2 is a cross sectional view of two components 110 and 111 joined together by a stud and nut combination 112 according to the present invention. Component 110 has a first hole 113 which extends therethrough from a first surface 114 to an opposite second surface 115. The hole 113 has a longitudinal axis 116 and a first axial section 117 and a coaxially aligned counterbored section 118 that extends from the first surface 114 to the first axial section 117. The counterbored section has an annular sidewall 119 with at least one recessed cavity 120. The recessed cavity has a first wall 121 and second wall 122, with the second wall located between the first wall and the first axial section 117. The first wall extends generally radially outwardly from the longitudinal axis of hole 113. The counterbored section is cylindrically shaped in FIG. 2, but the counterbored section could be any suitable shape, e.g. frustoconical. The recessed cavity shown in FIG. 2 is in the shape of an annular groove, with the first wall 121 running circularly around the circumference of the counterbored section. The recessed cavity can be formed in a variety of other shapes, e.g. a notch or notches, and can be formed at any location within the counterbored section. The recessed cavity is preferably formed by a thread mill, and may be formed by other means, e.g. by a feed out attachment, or a special grooving tool as described above in reference to FIG. 1.

Component 111 has a first surface 123 and a second opposite surface 124. A hole 125, having a longitudinal axis 126, extends from first surface 123 into component 111. The hole 125 is in coaxial alignment with hole 113 in component 110, with the counterbored section of hole 113 remote from component 111. The coaxially aligned holes 113 and 125 receive a stud 127 and a nut 128 that is threadably attached to the stud. The stud is inserted into hole 113 at the first surface 114 of component 110 and extends through component 110 and into hole 125 so as to join together component 110 and 111. The nut 128 is recessed in the counterbored section of hole 113, but only occupies a portion of the counterbored section so that a portion of the counterbored section above the nut remains unoccupied. To further secure the components 10 and 111, at least one of the holes can be tapped to receive the threads of the stud.

A suitable castable material 131, such as a metal, thermoset polymer, or thermoplastic polymer, is applied to the counterbored section of hole 113. For example, the castable material can be aluminum, brass, bronze, cast iron, steel, ceramics, epoxy resin solutions, or machine grouts. Preferably, the castable material is aluminum. If one or both of components 110 and 111 are made of a composite material, then the castable material is preferably a polymeric material, e.g. a resin. If one or more of the components will be exposed to a corrosive material, for example if the components are part of a compressor containing an acidic gas, then the castable material is preferably a ceramic. When applied to the hole, the castable material is in a flowable state so as to fill the counterbored section and the recessed cavity. When the castable material hardens, the thus cast material will be secured within components 110, with the first wall 121 of the recessed cavity preventing the hardened cast material from loosening or falling out of the hole 113 due to vibrations or mechanical stress.

The first surface 114 of component 110 is then finished in order to provide a smooth surface 132. The surface can be smoothed by removing any excess castable material 131 on surface 114. Or, component 110 can be thinned to form a new surface 132, so that the level of castable material in hole 113 is flush with the new surface. The surface may be finished by turning, milling or grinding. Preferably the surface is finished by metal cutting with either a lathe or a mill, depending on the location of the joined components. Grinding is preferably used when component 110 is made of ceramic.

In another embodiment, the hole 125 in component 111 may include a coaxially aligned counterbored section and recessed cavity therein, as described for component 110, that extends from surface 124 towards surface 123. The counterbored section receives a nut that threadably attaches to the stud 127. In such an embodiment, the hole 125 must extend throughout the component 111 from the first surface 123 to second surface 124 to allow access to the stud 127.

While these figures show a bolt and stud and nut combination as fastening devices, it will be appreciated by one skilled in the art that a variety of other fastening devices may also be used to join components together, while still utilizing the counterbored hole and recessed cavity portions of the present invention.

Although two embodiments of the invention have been illustrated in FIGS. 1 and 2, it will be understood that the invention is not limited to the embodiments disclosed, but is capable of numerous rearrangements, modifications and substitutions without departing from the scope of the invention.

What is claimed is:

1. A method for joining together at least a first structural element and a second structural element, wherein said first structural element has first and second surfaces with a first hole extending through said first structural element from said first surface to said second surface, said first hole having a longitudinal axis and a first axial section and a second axial section having larger radial dimensions than said first axial section and being positioned along said longitudinal axis, said second axial section having an annular sidewall surface with at least one recessed cavity formed in said annular sidewall surface, each said at least one recessed cavity having a first wall portion and a second wall portion with each said second wall portion being located between the first wall portion of the respective recessed cavity and the first axial section of said first hole and with each said first wall portion extending generally outwardly with respect to the longitudinal axis of said first hole, said second structural element having a first surface with a second hole opening in said first surface of said second structural element, said second hole having threads and a longitudinal axis; said method comprising the steps of:

positioning one of said first and second structural elements with respect to the other such that said first hole and said second hole are substantially coaxial with each other with said second axial section of said first hole being remote from said second structural element;

positioning a fastener, having a head portion, in said first and second holes so as to join said first and second structural elements, such that said fastener occupies only a portion of said second axial section of said first hole and thereby creates an unoccupied portion of said second axial section of said first hole, the unoccupied portion including a portion of said second axial section located between the head portion of said fastener and said first surface of said first structural element and including said at least one recessed cavity, wherein said fastener has threads for engaging the threads of said second hole;

applying a castable material in a flowable state to said unoccupied portion of said second axial section of said first hole so as to fill the theretofore unoccupied portion of said second axial section of said first hole, including said at least one recessed cavity;

causing the thus applied castable material including the portion therein in said at least one recessed cavity to solidify to thereby mechanically retain the thus solidified material in said first structural element.

2. A method in accordance with claim 1, wherein said fastener has a shank portion, wherein said head portion of said fastener is recessed in the second axial section of said first hole and said shank portion of said fastener longitudinally extends through said first axial section of said first hole and into said second hole.

3. A method in accordance with claim 1, wherein said castable material is a metal.

4. A method in accordance with claim 1, wherein said at least one recessed cavity is at least one annular groove.

5. A method in accordance with claim 4, wherein each of said at least one annular groove has a longitudinal axis which is at least substantially coaxial with the longitudinal axis of said first hole.

6. A method in accordance with claim 1, wherein said at least one recessed cavity is located between the head portion of said fastener recessed in said second axial section and said first surface of said first structural element.

7. A method in accordance with claim 1, further comprising the step of removing any excess castable material so as to smooth said first surface of said first structural element.

8. A method in accordance with claim 1, further comprising the step of removing a portion of said first structural element so as to remove any excess castable material and to provide a new first surface of said first structural element which is smooth.

9. A method in accordance with claim 8, wherein said step of removing comprises milling said first structural element.

10. A method in accordance with claim 1, wherein said second axial section is a counterbore.

11. A method for joining together at least a first structural element and a second structural element, wherein said first structural element has first and second surfaces with a first hole extending through said first structural element from said first surface to said second surface, said first hole having a longitudinal axis and a first axial section and a second axial section having larger radial dimensions than said first axial section and being positioned along said longitudinal axis, said second axial section having an annular sidewall surface with at least one recessed cavity formed in said annular sidewall surface, each said at least one recessed cavity having a first wall portion and a second wall portion with each said second wall portion being located between the first wall portion of the respective recessed cavity and the first axial section of said first hole and with each said first wall portion extending generally outwardly with respect to the longitudinal axis of said first hole, said second structural element having a first surface with a second hole opening in said first surface of said second structural element, said second hole having a longitudinal axis; said method comprising the steps of:

positioning one of said first and second structural elements with respect to the other such that said first hole and said second hole are substantially coaxial with each other with said second axial section of said first hole being remote from said second structural element;

positioning a threaded element, comprised of a stud and a nut, said nut being threadably attached to said stud, in said first and second holes so as to join said first and second structural elements and wherein said nut is recessed in the second axial section of said first hole and said stud longitudinally extends through said first axial section of said first hole and into said second hole, said threaded element further being positioned such that said threaded element occupies only a portion of said second axial section of said first hole and thereby creates an unoccupied portion of said second axial section of said first hole, the unoccupied portion including a portion of said second axial section located between the nut and said first surface of said first structural element and including said at least one recessed cavity;

applying a castable material in a flowable state to said unoccupied portion of said second axial section of said first hole so as to fill the theretofore unoccupied portion of said second axial section of said first hole, including said at least one recessed cavity; and causing the thus applied castable material including the portion therein in said at least one recessed cavity to solidify to thereby mechanically retain the thus solidified material in said first structural element.

12. A structure of joined elements comprising:

a first element having first and second surfaces with a first hole extending through said first element from said first surface to said second surface, said first hole having a longitudinal axis and a first axial section and a second axial section having larger radial dimensions than said first axial section and being positioned along said longitudinal axis, said second axial section having an annular sidewall surface with at least one recessed cavity formed in said annular sidewall surface, each said at least one recessed cavity having a first wall portion and a second wall portion with each said second wall portion being located between the first wall portion of the respective recessed cavity and the first axial section of said first hole and with each said first wall portion extending generally outwardly with respect to the longitudinal axis of said first hole;

a second element having a first surface and a second hole opening in said first surface of said second element, said second hole having threads and a longitudinal axis, wherein said second structural element is positioned with respect to the first structural element such that said first hole and said second hole are substantially coaxial with each other with said second axial section being remote from said second structural element;

a fastener having a head portion, the fastener being positioned in said first and second holes so as to join said first and second elements, such that said fastener occupies only a portion of said second axial section of said first hole and thereby creates an unoccupied portion of said second axial section of said first hole, the unoccupied portion including a portion of said second axial section located between the head portion of said fastener and said first surface of said first structural element and including said at least one recessed cavity, and wherein said fastener has threads for engaging the threads of said second hole;

a hardened cast material contained within said first hole so as to fill the unoccupied portion of said second axial section of said first hole and said at least one recessed cavity wherein said hardened cast material is thereby mechanically retained in said first structural element.

13. A structure in accordance with claim 12, wherein said fastener has a shank portion, wherein said head portion of said fastener is recessed in the second axial section of said first hole and said shank portion of said fastener longitudinally extends through said first axial section of said first hole and into said second hole.

14. A structure in accordance with claim 12, wherein said fastener comprises a stud and nut, said nut being threadably attached to said stud, and wherein said nut is recessed in the second axial section of said first hole and said stud longitudinally extends through said first axial section of said first hole and into said second hole.

15. A structure in accordance with claim 12, wherein said hardened cast material is a metal.

16. A structure in accordance with claim 12, wherein said at least one recessed cavity is at least one annular groove.

17. A structure in accordance with claim 16, wherein each of said at least one annular groove has a longitudinal axis which is at least substantially coaxial with the longitudinal axis of said first hole.

18. A structure in accordance with claim 12, wherein said first surface of said first structural element is smooth and has no excess cast material thereon.

19. A structure in accordance with claim 12, wherein said second axial section of said first hole is a counterbore.

20. A structure in accordance with claim 12, wherein said at least one recessed cavity is located between the head portion of said fastener and said first surface of said first element.

* * * * *